(12) United States Patent
Anderson

(10) Patent No.: US 6,488,320 B1
(45) Date of Patent: Dec. 3, 2002

(54) QUICK CONNECT COUPLING

(75) Inventor: Stephen J. Anderson, Livonia, MI (US)

(73) Assignee: Pilot Industries, Inc., Dexter, MI (US)

( * ) Notice: Subject to any disclaimer, the term of this patent is extended or adjusted under 35 U.S.C. 154(b) by 0 days.

(21) Appl. No.: 09/946,105

(22) Filed: Sep. 4, 2001

(51) Int. Cl.⁷ ............................................. F16L 39/00
(52) U.S. Cl. ................ 289/319; 137/512.3; 137/614.05
(58) Field of Search ....................... 285/319; 137/515.5, 137/515.7, 512.3, 614.05

(56) References Cited

U.S. PATENT DOCUMENTS

| | | | | |
|---|---|---|---|---|
| 4,819,908 A | * | 4/1989 | Norkey | 251/149.6 |
| 4,981,586 A | * | 1/1991 | Bartholomew | 285/319 |
| 5,056,756 A | * | 10/1991 | Norkey et al. | 251/149.6 |
| 5,113,900 A | * | 5/1992 | Gilbert | 137/515.5 |
| 5,823,508 A | * | 10/1998 | Nie | 285/319 |
| 5,988,705 A | * | 11/1999 | Norkey | 137/614.05 |

* cited by examiner

Primary Examiner—Lynne H. Browne
Assistant Examiner—Aaron M Dunwoody
(74) Attorney, Agent, or Firm—Gifford, Krass, Groh, Sprinkle, Anderson & Citkowski, P.C.

(57) ABSTRACT

A quick connect coupling for use with a conduit having a free end with a bead is disclosed. The coupling includes an elongated tubular and cylindrical housing having a female end portion at one end and a male end portion at its other end. An axial passageway is formed through the housing and forms a fluid passageway connecting the female end to the male end. The housing, furthermore, includes a first part and a second part which are coaxially detachably secured together at a midpoint of the housing. A retainer positioned within the female end portion automatically lockingly engages the bead on the conduit upon insertion of the conduit into the female end portion on the first housing part. A one-way check valve is contained within the second housing part which enables fluid flow in a single direction through the fluid passageway. A filter is secured to one of the housing parts so that the filter extends across the fluid passageway, and this filter is accessible for cleaning or other maintenance upon detachment of the first housing part from the second housing part.

7 Claims, 2 Drawing Sheets

QUICK CONNECT COUPLING

BACKGROUND OF THE INVENTION

I. Field of the Invention

The present invention relates generally to fluid couplings and, more particularly, to a quick connect coupling adapted to receive a tubular conduit having a radially outwardly extending bead adjacent a free end of the conduit.

II. Description of Related Art

There are many previously known quick connect couplings which are adapted for use with tubular conduits having a radially outwardly extending bead adjacent a free end of the conduit. Such quick connect couplings are used extensively in the automotive industry.

These previously known quick connect couplings typically comprise an elongated tubular and cylindrical housing having an axial throughbore which forms the fluid passageway through the housing. This bore is open at both ends.

One end of the housing forms a female end portion and includes an enlarged diameter portion adapted to axially slidably receive the free end of the tubular conduit until the conduit bead is positioned within the interior of the housing. Furthermore, upon insertion of the conduit into the housing, a retainer contained within the housing lockingly engages the bead to retain the housing and the conduit together.

In many applications, it is advantageous for the quick connect coupling to include a one-way valve to permit fluid flow through the coupling in only a single direction. One such quick connect coupling is disclosed in U.S. Pat. No. 5,988,705 which issued on Nov. 23, 1999. Such a coupling is particularly advantageous for use in the fuel supply system for a fuel injected internal combustion engine.

Such fuel injection systems for internal combustion engines typically comprise a fuel sender contained within or adjacent the fuel tank which pumps fuel through a one-way valve to a fuel rail. A quick connect coupling is conventionally contained in the fluid connection between the fuel sender and the fuel rail so that the one-way valve contained within the quick connect coupling is redundant with the upstream one-way valve.

One disadvantage of these previously known systems, however, is that debris flows downstream to the quick connect coupling with its one-way valve. Such debris can lodge within the one-way valve contained within the quick connect coupling thus causing malfunction of the one-way valve in the coupling.

SUMMARY OF THE PRESENT INVENTION

The present invention provides a quick connect coupling which overcomes all of the above-mentioned disadvantages of the previously known devices.

In brief, the quick connect coupling of the present invention comprises an elongated tubular and cylindrical housing having a female end portion at one end and a male end portion at its opposite end. An axial passageway is formed through the housing which forms a fluid passageway fluidly connecting the female and male end portions together.

Unlike the previously known quick connect couplings, the housing includes a first part and a second part in which the female end portion is formed on one end of the first housing part while the male end portion is formed on one end of the second housing part. The other ends of the housing parts are then coaxially detachably secured together by any conventional means, such as a threaded connection, bayonet connection or the like. An appropriate fluid seal is disposed between the other ends of the housing parts to eliminate leakage from the quick connect coupling at the joint between the two housing parts.

A retainer is positioned within the internal bore of the female end portion which automatically lockingly engages the bead on the conduit upon insertion of the conduit into the internal bore of the female end portion. Similarly, a one-way check valve is contained within the second housing part which permits fluid flow through the axial fluid passageway in only a single direction.

Unlike the previously known quick connect couplings, however, a filter is secured to the housing adjacent the other ends of the housing parts, i.e. the ends of the housing parts that are detachably secured together, so that the filter extends across the fluid passageway. This filter is preferably a screen filter and is accessible for cleaning, maintenance or the like by simply detaching the housing parts from each other, performing the maintenance on the filter, and then reattaching the housing parts together.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
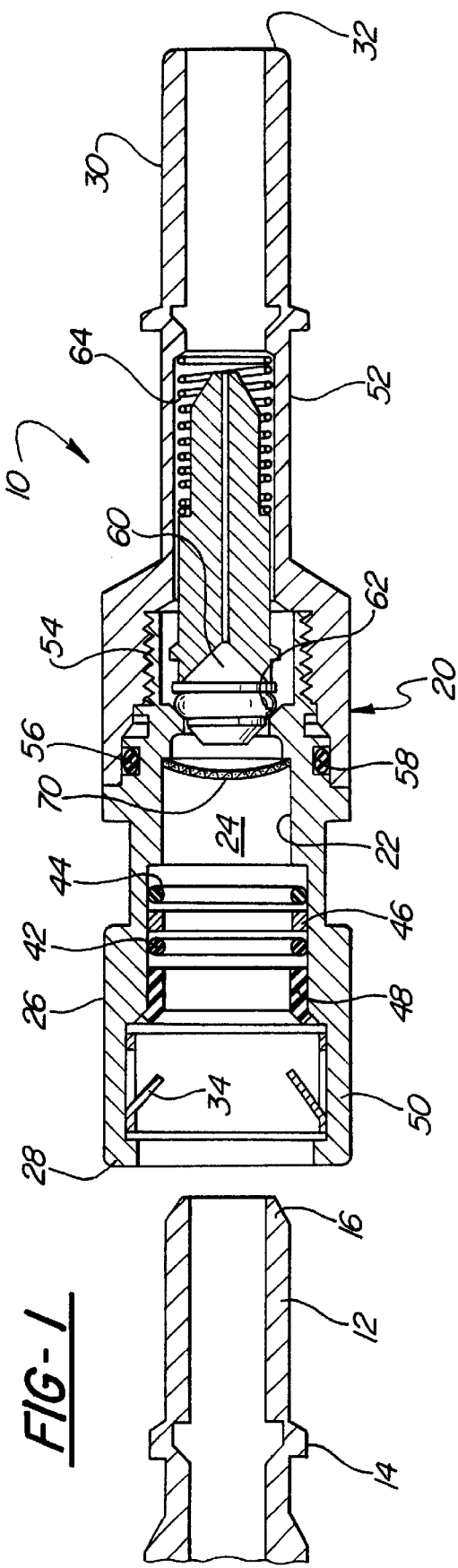
FIG. 1 is a longitudinal sectional view of a preferred embodiment of the invention.
Figure 2:
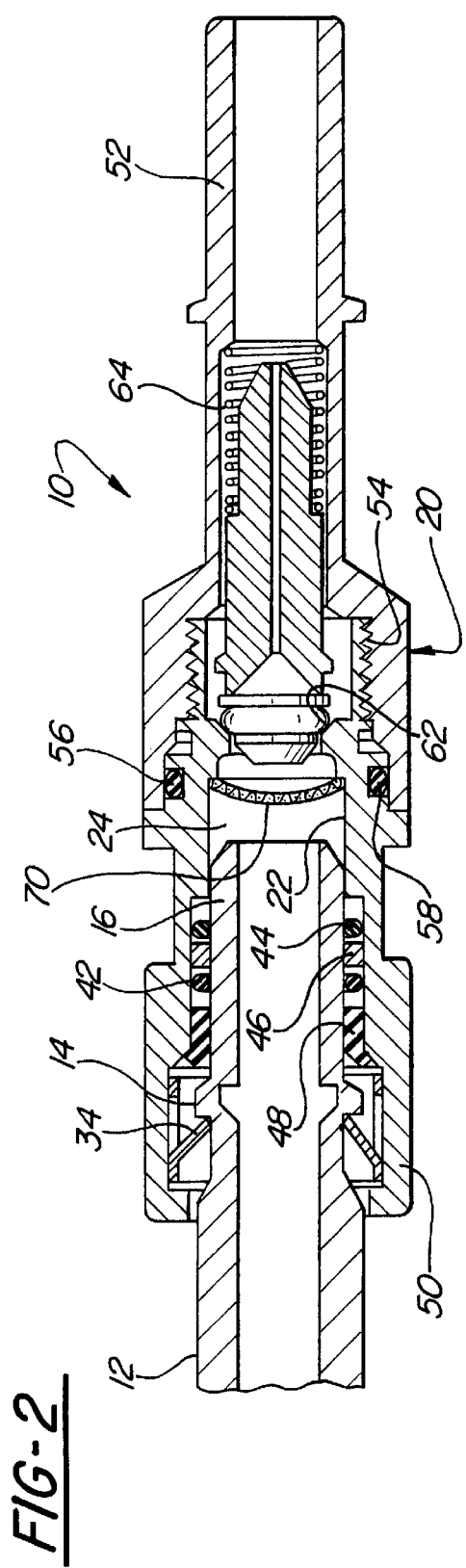
FIG. 2 is a view similar to FIG. 1, but illustrating the connector with an attached conduit.

With reference first to FIGS. 1 and 2, a preferred embodiment of the quick connect coupling 10 of the present invention is there shown for use with a fluid conduit 12. The fluid conduit 12 includes a radially outwardly extending bead 14 formed adjacent its free end 16 in the conventional fashion.

The quick connect coupling 10 includes an elongated tubular and cylindrical housing 20 having an axial throughbore 22 formed through the housing 20. This axial throughbore 22, in turn, forms an axial fluid passageway 24 through the housing 20.

Still referring to FIGS. 1 and 2, a female end portion 26 is formed at one end 28 of the housing 20 while a male end portion 30 is formed at the opposite end 32 of the housing 20. The female end portion 26, furthermore, includes an enlarged diameter portion sufficient to receive the free end 16 of the fluid conduit 12 as best shown in FIG. 2.

In the conventional fashion, a retainer 34 is positioned within an enlarged diameter bore at the female end portion 28 of the housing 20. This retainer 34 lockingly engages the bead 14 of the fluid conduit 12 upon insertion of the end 16 of the fluid conduit 12 into the female end portion 26 to the inserted position shown in FIG. 2.

At least one and preferably two fluid seals 42 and 44 are contained within the housing 20 which compress against and fluidly seal the housing 20 to the conduit 12 upon insertion of the conduit 12 into the female end portion 26 as shown in FIG. 2. A spacer 46 is preferably disposed between the fluid seals 42 while a bushing 48 retains the fluid seals 42 and spacer 46 to the housing 20.

Unlike the previously known quick connect couplings, the housing 20 includes a first housing part 50 and a second housing part 52. These housing parts 50 and 52 are coaxially secured together by any conventional means, such as a threaded connection 54 or the like. A fluid seal 56 is disposed within a radial groove 58 on the first housing part 50 and this fluid seal 56 is compressed in between the housing parts 50 and 52 as they are attached together.

A one-way valve 60 is contained within the second housing part 52 and cooperates with a valve seat 62 formed on the second housing part 52. A compression spring 64 urges the valve 60 towards its closed position.

Figure 3:
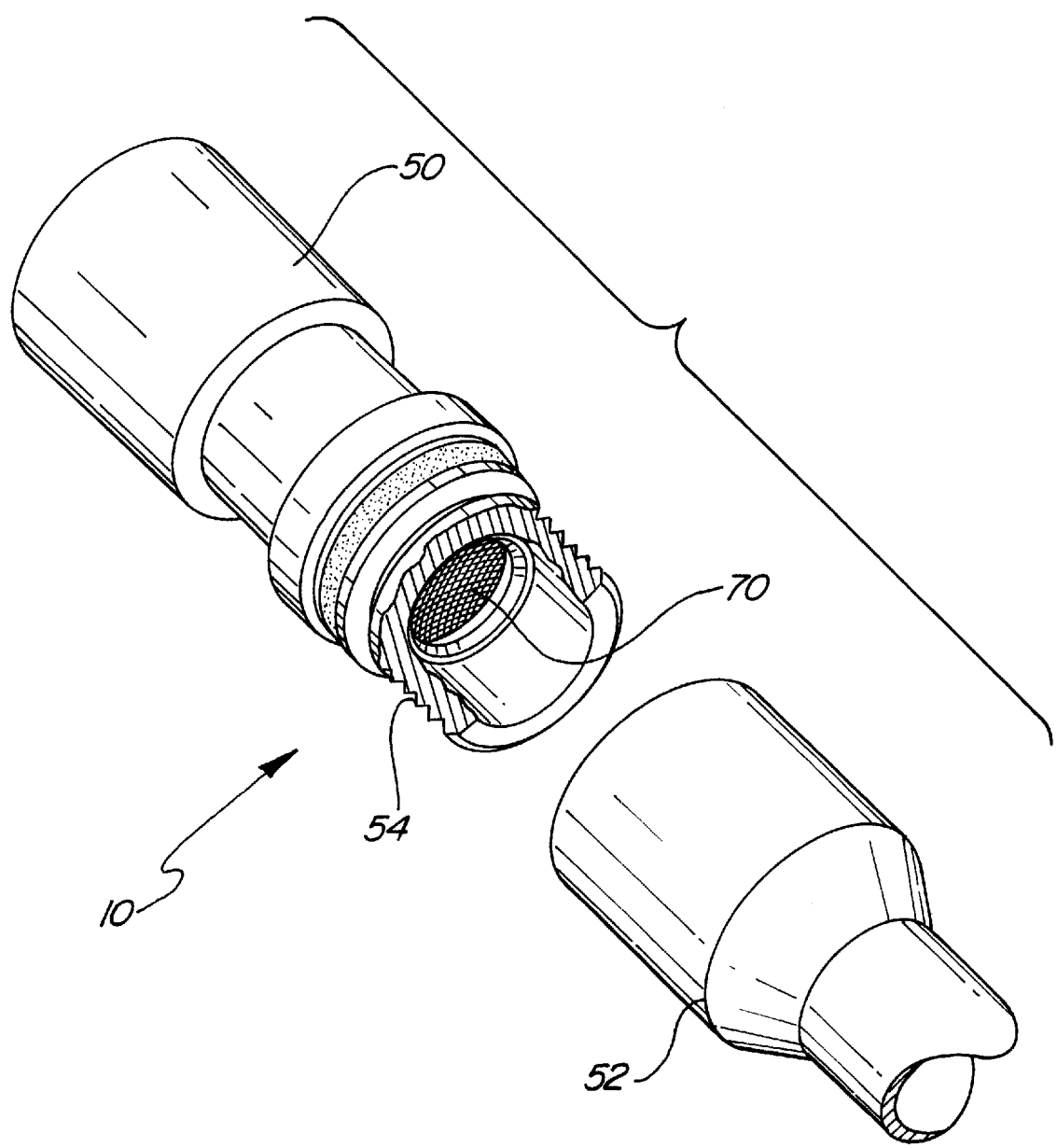
FIG. 3 is an exploded view of the preferred embodiment of the invention.

Referring now particularly to FIGS. 2 and 3, a filter 70 is disposed across the fluid passageway 24 at a position adjacent the connection between the housing parts 50 and 52. This filter 70 is preferably a screen and is accessible for cleaning by back flushing, maintenance or the like upon detachment of the housing parts 50 and 52 from each other as shown in FIG. 3. It will, of course, be appreciated that the one-way valve 60 precludes back flushing of the filter 70 before the housing parts 50 and 52 are separated as shown in FIG. 3. After the required cleaning or other maintenance has been performed on the filter 70, the housing parts 50 and 52 are reattached together whereupon the coupling 10 is used in the normal fashion.

The one-way valve 60 permits fluid flow through passageway 24 from the end 28 of the housing 20 and to the end 32 of the housing 20. Since the screen 70 is fluidly disposed between the one-way valve 60 and the inlet end 28 of the housing 20, the screen 70 effectively protects the one-way valve 60 from debris or other contamination.

From the foregoing, it can be seen that the present invention provides a simple and yet effective quick connect coupling having a one-way valve which overcomes the previously discussed disadvantages of the previously known devices. Having described my invention, however, many modifications thereto will become apparent to those skilled in the art to which it pertains without deviation from the spirit of the invention as defined by the scope of the appended claims.

I claim:

1. A quick connect coupling for use with a conduit having a free end with a bead comprising:

an elongated tubular and cylindrical housing having a female end portion at one end and a male end portion at its other end, an axial passageway formed through said housing which forms a fluid passageway, said housing having a first part and a second part separable from said first housing part, said female end portion being formed on one end of said first housing part and a male end portion being formed on one end of said second housing part, means for coaxially detachably connecting the other ends of said housing parts together said connecting means comprising a threaded connection between said first and second housing parts, said female end portion of said housing having an enlarged diameter internal bore adapted to axially receive the free male end of the conduit, a retainer positioned in said internal bore of said female end portion which automatically lockingly engages the bead on the conduit upon insertion of the conduit into the internal bore of the female end portion, a one-way check valve contained within said second housing part, and a filter secured to said housing adjacent said other ends of said housing parts, said filter extending across said fluid passageway between said one end of said first housing part and said check valve.

2. The invention as defined in claim 1 wherein said filter comprises a screen.

3. The invention as defined in claim 1 and comprising a seal disposed between said other ends of said housing parts.

4. The invention as defined in claim 3 and comprising an annular groove formed around the outer periphery adjacent said other end of said second housing part, and wherein said seal comprises a resilient annular seal disposed in said groove, said seal being sandwiched between said second housing part and an inside cylindrical section of said first housing part.

5. The invention as defined in claim 1 wherein said housing parts are made of metal.

6. The invention as defined in claim 1 and comprising at least one annular fluid seal positioned in said internal bore of said female end portion, said annular fluid seal engaging an outer periphery of the conduit upon insertion of the conduit into said internal bore of said female end portion.

7. The invention as defined in claim 6 wherein said at least one annular fluid seal comprises two annular fluid seals, and further comprising an annular spacer positioned between said seals.

\* \* \* \* \*